United States Patent [19]

Cross

[11] 4,227,141

[45] Oct. 7, 1980

[54] ELECTRIC BATTERY CHARGING APPARATUS

[75] Inventor: Bryan Cross, Bolton, England

[73] Assignee: Chloride Group Limited, London, England

[21] Appl. No.: 911,169

[22] Filed: May 31, 1978

[30] Foreign Application Priority Data

Sep. 13, 1977 [GB] United Kingdom ............... 38134/77

[51] Int. Cl.² ................................................ H02J 7/04
[52] U.S. Cl. ...................................... 320/20; 320/38; 320/40
[58] Field of Search ................... 320/20, 21, 37, 38, 320/39, 40

[56] References Cited

U.S. PATENT DOCUMENTS

| | | | |
|---|---|---|---|
| 3,081,426 | 3/1963 | Bakke | 320/38 X |
| 3,593,100 | 7/1971 | Foster | 320/31 X |
| 3,886,427 | 5/1975 | Long | 320/37 X |
| 3,979,658 | 9/1976 | Foster | 320/37 X |
| 3,992,658 | 11/1976 | Bechtold et al. | 320/20 |

Primary Examiner—Robert J. Hickey
Attorney, Agent, or Firm—Oblon, Fisher, Spivak, McClelland & Maier

[57] ABSTRACT

For use in an automatic electric battery charger, a charge controller which monitors the rate of rise of battery voltage, and terminates the charge when the rate of rise falls below a predetermined value, typically 11 mV per cell in 45 minutes for a lead-acid battery. The battery voltage is monitored by combining with it a ramp signal which changes, in the opposite sense to the rise in battery voltage, at a rate just sufficient to offset a rise in battery voltage of the said predetermined value. In the preferred embodiment, the combining step is performed by a summing amplifier, and a bias signal is also fed to the summing amplifier; this bias signal is shifted, in one direction only, to hold the output of the amplifier between narrow limits as long as the rate of rise of battery voltage is greater than the predetermined value. As soon as the rate of rise of battery voltage is no longer sufficient to offset the ramp signal, the amplifier output shifts outside the said limits, and this shift is used to terminate the charge.

18 Claims, 6 Drawing Figures

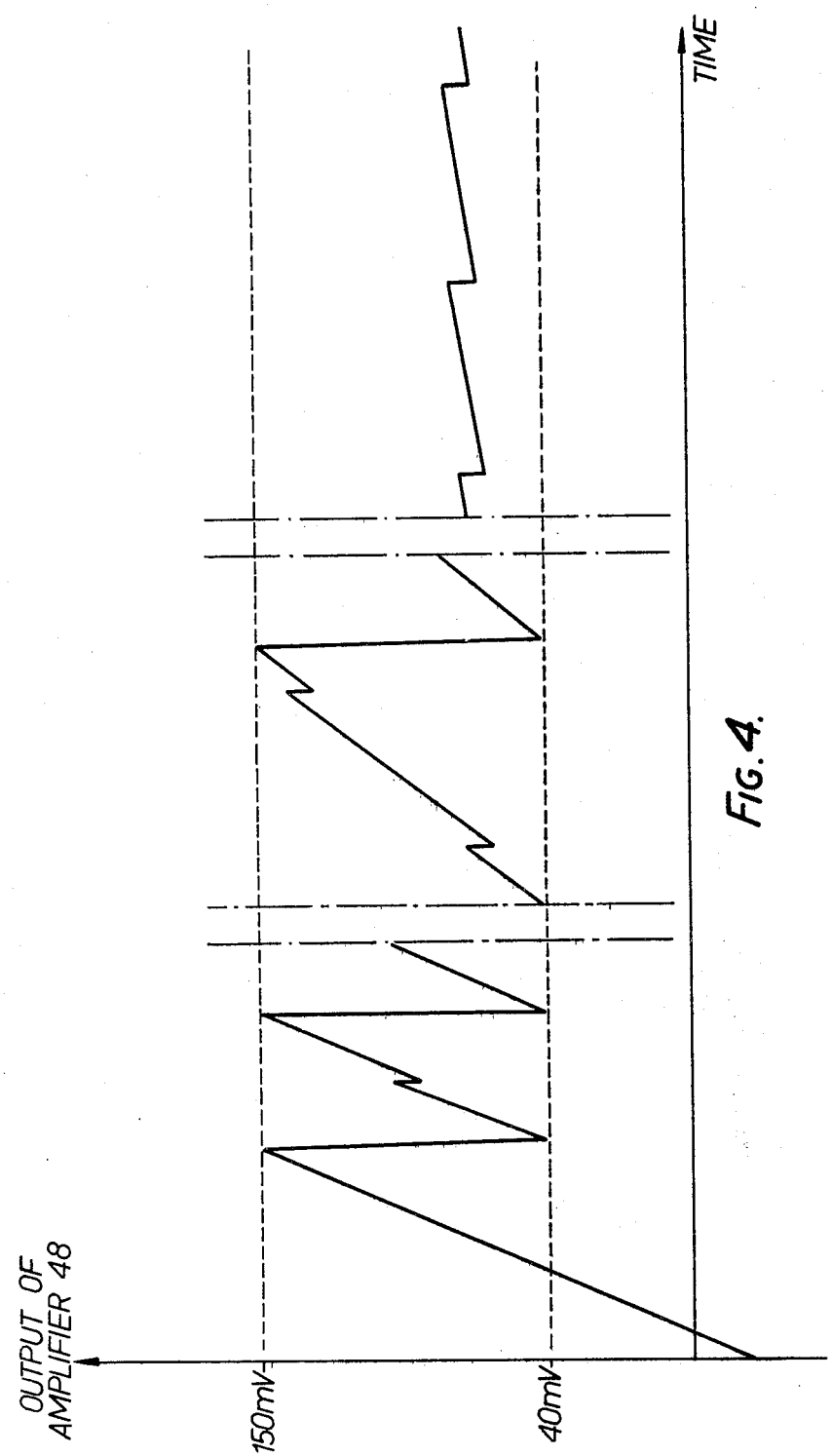

ELECTRIC BATTERY CHARGING APPARATUS

This invention relates to electric battery charging apparatus including means arranged automatically to terminate the charge, or a phase of the charge. More particularly, it relates to battery charging apparatus in which such termination occurs when the rate of rise of a control signal dependent on the battery voltage falls below a predetermined value, indicating that the battery is practically fully charged. Our British patent specification No. 1,097,451 describes one form of such apparatus, and a number of other arrangements of this type have since been proposed.

According to the present invention, the charge terminating means includes means arranged to combine a signal dependent on battery voltage and a ramp signal, the signal combining means being arranged to produce a combination signal which changes in one sense in response to a rise in battery voltage, and in the opposite sense in response to the rise of the ramp signal, and the charge terminating means further comprising means arranged to monitor the combination signal, and to terminate the charge, or a phase of it, when the change in the combination signal in the said one sense, due to rise in battery voltage, is no longer sufficiently large to offset completely the change in the said opposite sense due to the rise in the ramp signal.

In the case of a lead-acid battery, a normal criterion for terminating the charge is that the cell voltage should be rising at less that 11 mV in 45 minutes. When using charge terminating means according to the present invention, the ramp signal may therefore have a slope equivalent to 11 mV per cell in 45 minutes, so that the combination signal begins to change in the opposite sense as soon as the criterion for charge termination has been met.

The term 'charge termination', as used above, is intended to cover both complete switching off of the charging current, and reduction of the average value of the charging current to a much lower value; for example, after termination of the main phase of the charge, the battery might receive a continuous trickle charge, or periods of normal charging at intervals of, say, 12 hours, to refresh the battery.

Various methods may be used to determine when the change in the said one sense in the combination signal, due to the rise in battery voltage, is no longer large enough to offset completely the change in the opposite sense due to the rise in the ramp signal. In one method, means may be provided to store the extreme value which the combination signal has so far reached in the said one sense, and to compare the stored extreme value with the actual value of the combination signal; as soon as the combination signal changes in the said opposite sense by more than a predetermined amount, the comparing means will detect the resulting difference between the stored signal and the combination signal, and terminate the charge.

In a somewhat different arrangement, a store is also provided, but the signal provided by the store is combined by the combining means with the signal dependent on battery voltage and the ramp signal. The combination signal monitoring means is now so arranged that, when the combination signal reaches a predetermined value, the stored signal is modified in such a sense as to prevent the combination signal from shifting in the said one sense beyond the said predetermined value; thus, when the rise in battery voltage is no longer sufficient to offset completely the rise in the ramp signal, the stored signal will no longer be modified, and the combination signal will shift away from the said predetermined value in the said opposite sense. When this change has exceeded a predetermined amount, the charge is terminated.

The store may be either an analogue or a digital store; in the case of a digital store, the output of the store would normally be coupled directly to a digital-analogue converter, so that the combining or comparing step can be performed on an analogue signal. It should be understood, however, that this does not exclude the possibility of combining or comparing signals in digital form.

In any battery charging arrangement in which charge termination depends upon the rate of rise of battery voltage, the difficulty arises that the battery voltage will vary with fluctuation of supply voltage as well as with the state of charge of the battery. To overcome this difficulty, the present applicants have proposed in British patent specification No. 1,495,523 to provide means for generating a control signal which constitutes the difference between a signal dependent on battery voltage and a signal dependent on a.c. supply voltage. The proportion may be such that the resultant control signal is substantially independent of fluctuations of a.c. supply voltage at least when the battery is approaching the fully charged condition. The signal dependent on battery voltage which is combined with the ramp signal by the combining means may constitute a control signal which is derived in a manner similar to that described in the above-mentioned specification No. 1,495,523; however, in the preferred embodiment, the combining means also performs the task of combining a signal which is dependent only on battery voltage with a signal which is dependent on a.c. supply voltage. Thus, in addition to the signal dependent only on battery voltage, the ramp signal, and (possibly) the stored signal, the combining means may receive a signal dependent on the a.c. supply voltage.

During the early stages of a charge, the battery voltage may rise only slowly, possibly at less than 11 mV per cell in 45 minutes, and therefore the combination signal monitoring means may be prevented from terminating the charge until the battery voltage has risen above about 2.35 volts per cell, in the case of a lead-acid battery. It may also be necessary to prevent termination of the charge, even after the battery voltage has risen above 2.35 volts per cell, since the mains voltage compensation described above may not give strictly accurate compensation until the battery is quite close to the fully charged condition. This approach to the fully charged condition may be indicated by the fact that the rate of rise of battery cell voltage has fallen below a predetermined value, greater than the value at which the battery is regarded as being fully charged; this greater value can be so chosen that, provided the battery voltage has risen above 2.35 volts per cell, the approach to the fully charged condition is reliably indicated, despite fluctuations in the mains supply voltage and imperfections in the mains voltage compensation arrangements.

Where a signal is stored in digital form, as mentioned above, one convenient way of obtaining the indication that the battery is approaching the fully charged condition is to monitor the time between changes in the stored signal. When this time exceeds a predetermined value, this shows that the rate of rise of the combination signal has fallen below a predetermined value. The time may be monitored by a digital timer which is reset every time the stored signal changes. This timer may also be arranged to be inhibited completely as long as the battery voltage is less than 2.35 volts per cell, so that a single disabling signal is provided which prevents charge termination until the battery approaches the fully charged condition. The combination signal monitoring means may be arranged to provide the indication that the 2.35 volts per cell level has been reached, by so arranging its bias levels that, at this cell voltage, its output passes the switching threshold of a logic device, which then enables the digital timer to begin its count.

The ramp signal may be produced by a digital counter which is coupled to a digital-analogue converter, and is stepped continuously, at least during some stages of the charge. In the preferred embodiment, this stepping does not begin until the battery voltage reaches 2.35 volts per cell, so that the combination signal can be used to indicate accurately when this voltage has been reached. The counter may also serve the functions of limiting the overall duration of the charge, and/or providing a refreshing or topping-up charge at intervals if the battery is left connected to the charging apparatus after the main charge has been terminated. Thus, the most significant bit of the counter may be connected to charge inhibiting means, to inhibit further charging after this bit has changed state from its initial state, and/or to resetting means arranged to reset at least part of the charge terminating means to its initial state, so that charging restarts when the bit reverts to its initial state.

The invention may be carried into practice in various ways, but two specific embodiments will now be described by way of example, with reference to the accompanying drawings, of which:

Figure 5:
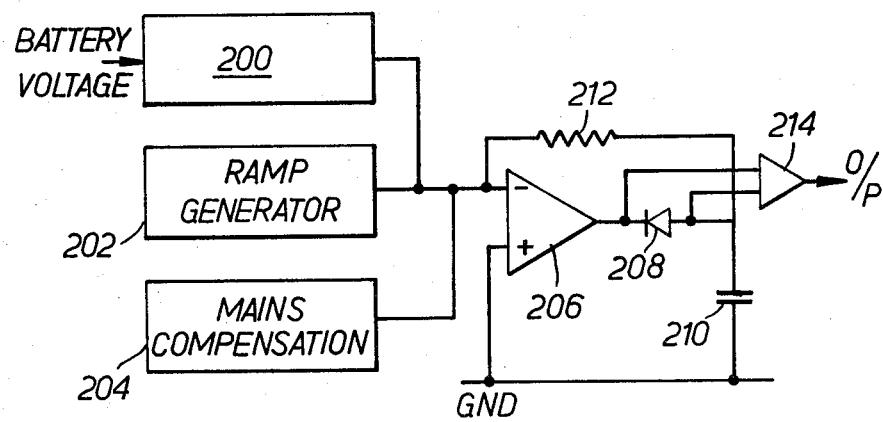
Figure 3A:
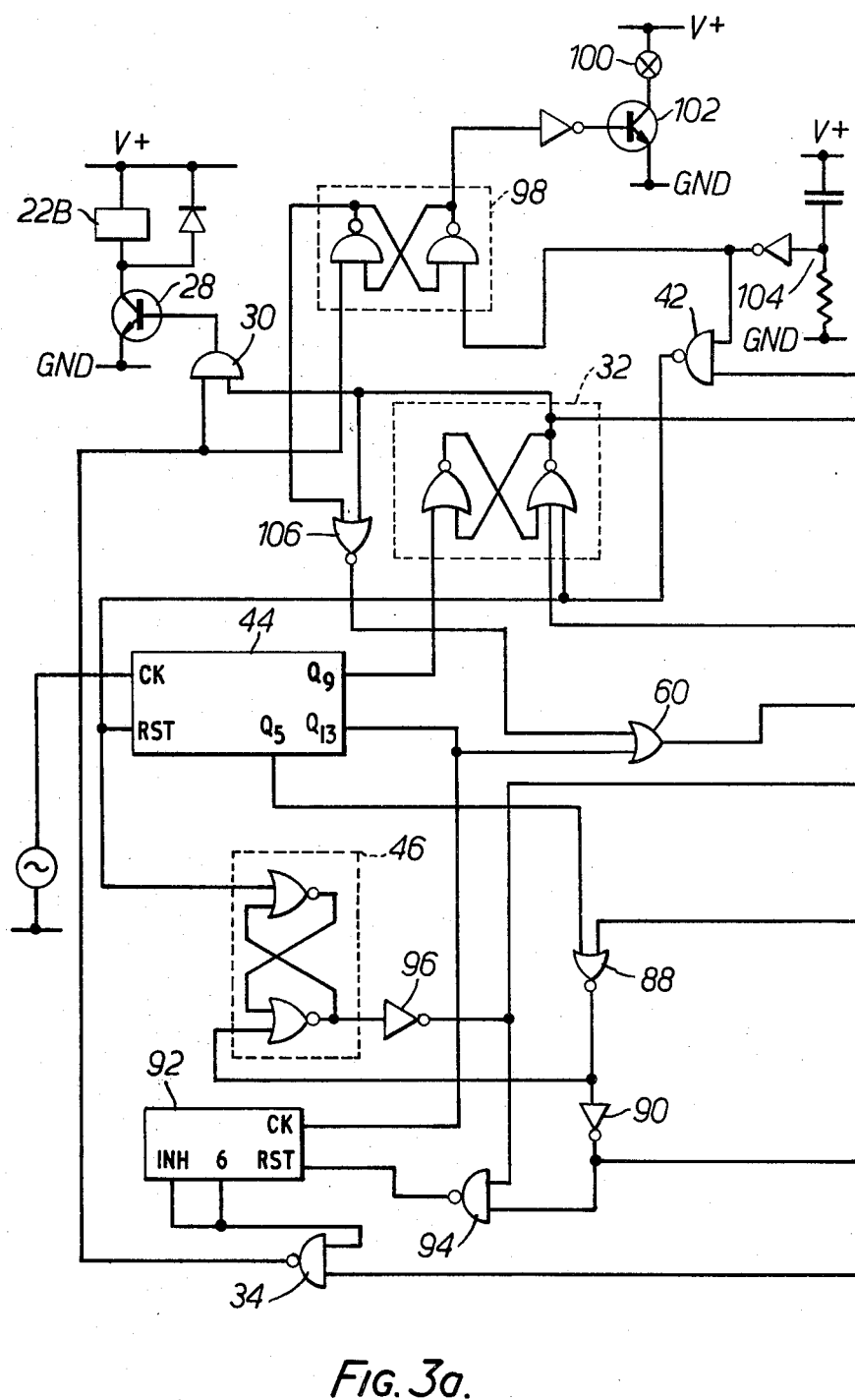
Figure 3B:
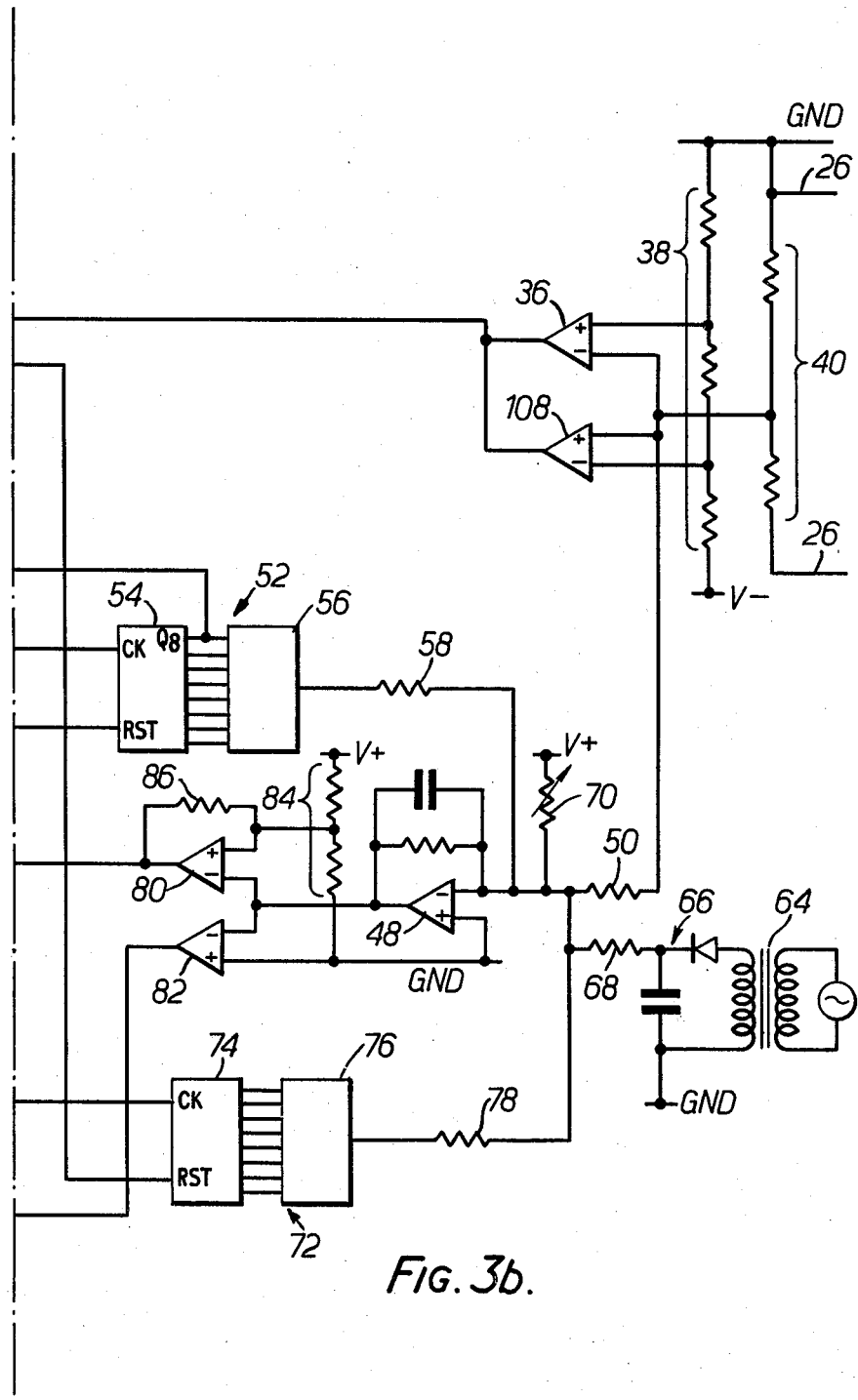

FIG. 3, which is drawn as two parts, FIG. 3a and FIG. 3b, is a more detailed circuit diagram of the part of the charger which is responsible for determining when a battery has reached a fully charged condition;

FIG. 4 is a graph illustrating certain of the voltage variations which occur in the circuit of FIG. 3; and FIG. 5 is a simplified diagram of an alternative circuit for determining when a battery has reached a fully charged condition.

Figure 1:
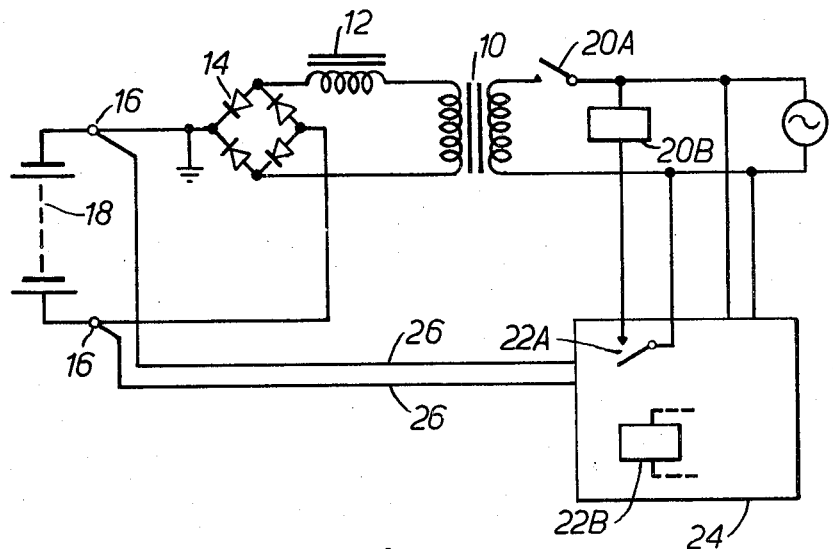
FIG. 1 is a schematic diagram, partly in block form, showing a battery charger embodying the invention, and intended for charging lead-acid batteries.

Referring first to FIG. 1, it can be seen that the charger comprises a transformer 10, ballast choke 12 and bridge rectifier 14 which serve to supply a charging current to terminals 16, to which the battery 18 being charged is connected. The mains power supply to the primary of the transformer 10 is controlled by the contacts 20A of a contactor, whose coil 20B is in turn energised by the contacts 22A of a relay. This relay, whose coil is shown at 22B, forms part of a charge controller, which is shown in FIG. 1 as a block 24; in addition to the connections to the relay contacts 22A, the charge controller 24 also has two connections 26 which lead to the terminals 16, to allow it to sense the voltage of the battery 18, and is supplied with power from the mains.

In operation, the charging of the battery is started by first connecting the charger to the mains supply, so that the charger controller is energised, and then connecting the battery 18 to the terminals 16. After a delay of about 5 seconds, the relay closes its contacts 22A, and therefore the contactor also closes its contacts 20A, energising the transformer 10. Charging current now flows into the battery 18; the current is controlled by the choke 12, and decreases as the battery voltage rises, giving a taper charging characteristic. When the battery voltage reaches about 2.35 volts per cell, the charge controller begins to monitor the rate of rise of battery voltage, in order to determine when the battery is fully charged. When the rate of rise of voltage falls below 11 mV per cell in 45 minutes, the battery is considered to be fully charged, and the charge is terminated.

Figure 2:
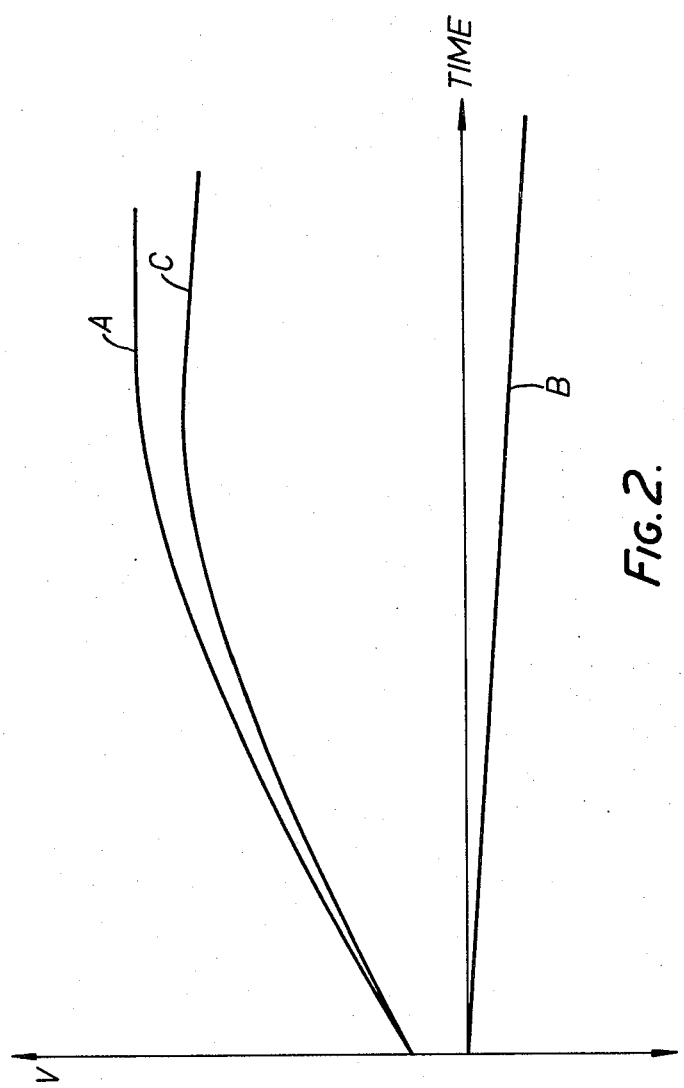
FIG. 2 is a graph illustrating the principle of operation of the battery charger.

FIG. 2 illustrates the broad principle which is used to ascertain when the rate of rise of the battery voltage has fallen below this value. The curve A represents a typical rise in cell voltage, plotted against time, as the battery approaches the fully charged state. The curve B represents a ramp signal, which changes steadily at a rate equivalent to a cell voltage change of 11 mV in 45 minutes, in the opposite direction to the change in the cell voltage signal; this ramp signal is generated within the charge controller 24. The curve C represents the signal obtained by combining the signals A and B, and it will be seen that this signal C reaches a maximum at the point where the slope of curve A is 11 mV per 45 minutes, and then decreases again. The charger controller 24 monitors the signal C, and terminates the charge as soon as the signal has decreased by more than a small amount from its maximum previously attained value, indicating that the peak of the curve C has been passed.

In practice, as will become apparent later on, other signals are combined with the signals A and B to facilitate the detection of this small decrease.

The charge controller 24 also includes means (described more fully later on) arranged to modify the cell voltage signal A in response to variations in mains voltage, in order that the signal A should be dependent only on the state of charge of the battery, and not on the mains supply voltage, but these signal modifying means cannot ensure that the signal A will be totally independent of mains voltage fluctuations over the whole of the charging period. Accordingly, the signal modifying means is arranged to perform correctly when the battery is approaching its fully charged state, and termination of the charge is inhibited until this state is approached. This avoids premature termination of the charge which might occur owing to fluctuations in mains supply voltage in the early stages of the charge. Also, it is quite normal for the battery voltage to rise slowly before the gassing voltage of about 2.35 volts per cell is reached, and the inhibition of termination mentioned above also ensures that the charge will not be prematurely terminated if the rate of rise of cell voltage should be less than 11 mV in 45 minutes in the early stages of a charge.

Referring now to FIGS. 3 and 4, the charge controller 24 will be described in greater detail. The relay coil 22B is controlled, through a driver transistor 28, by the output of an AND gate 30. One input of the gate 30 is connected to an output of a bistable latch 32, which is set after the 5 second delay (mentioned above) from connection of the battery 18 to the terminals 16, to enable the gate 30 and begin the charge. The other input of the gate 30 is supplied with the output of a NAND gate 34, which remains high until the conditions described above for the termination of a charge are fulfilled; at this time the output of the gate 34 goes low to disable the gate 30 and terminate the charge.

The connection of the battery 18 to the terminals 16 is detected by a comparator 36. The non-inverting input of the comparator 36 is supplied with a reference voltage of −1.5 v, which is derived by a potential divider 38 from a stabilised power supply rail, while the inverting input is supplied with a voltage which represents the voltage of one cell of the battery, and is derived by a potential divider 40 from the battery voltage supplied to the charge controller over the lines 26. The second input voltage to the comparator 36, like the first, is negative-going, since the positive battery terminal is connected to ground. Thus, the output of the comparator 36 will remain low as long as no battery is connected, but goes high as soon as a battery is connected to the terminals 16 (provided that the battery voltage is greater than 1.5 volts per cell). The output of the comparator 36 is applied, through a NAND gate 42, to a resetting input of the latch 32, and also to the resetting inputs of a binary counter 44 and a further bistable latch 46, for reasons which will be explained below. Thus, the latch 32 will be reset when no battery is connected, and will remain reset after the connection of the battery 18 until a setting signal occurs. This setting signal is provided by the counter 44, in the following manner.

The clock input of the counter 44 is continuously supplied with clock pulses at a frequency of 50 Hz, derived from the mains supply, but, because a reset input is also applied to the counter by the gate 42 as long as no battery is connected, the counter only begins counting when the battery 18 is connected. After the counter has counted 256 clock pulses (about 5 seconds of counting), its $Q_9$ output goes high, and this output constitutes the setting signal to the latch 32, to start the charge after the required delay.

The signals A and B are combined to provide the signal C by means of an operational amplifier 48, which is arranged to have a closed-loop voltage gain, referred to battery cell voltage, of about 45. Briefly, the signal C is monitored in the following manner, which may be best understood with reference to FIG. 4. When the battery voltage rises above about 2.35 volts per cell, the output of the amplifier 48 starts to go positive. When this output reaches 150 mV positive, a bias signal which is applied to the amplifier 48, in addition to the signals A and B, is shifted to bring the output signal down by a step of about 110 mV. This shaft appears as the first large downwards step in FIG. 4; the smaller steps are in fact the result of the signal B, which is not strictly a ramp signal, but a series of small steps. If the signal C continues to rise, the bias signal is again shifted stepwise every time the amplifier output reaches 150 mV. In this way, the bias on the amplifier 48 is so controlled that the amplifier output is never more than 150 mV positive. Thus, as soon as the signal C passes its maximum and begins to decrease again, the output of the amplifier will decrease proportionately, and will go negative again after a decrease of not more than 150 mV, corresponding to a drop in the signal C, for one cell of the battery, of not more than about 3 mV. When this occurs, the charge is terminated.

Describing the arrangement of the operational amplifier 48 in greater detail, this amplifier is connected as an inverting current-mode summing amplifier. The signal A is applied to the inverting input of the amplifier, which forms the summing node, by a resistor 50 which is connected between the summing node and the output of the potential divider 40. The signal B is provided by a circuit 52 which comprises an 8-bit binary counter 54 coupled to a digital-analogue converter 56; the analogue output of the converter 56, which constitutes the signal B, goes steadily more positive as the counter 54 counts, and is connected through a resistor 58 to the summing node. The counter 54 is clocked (at least when charging is taking place) by the $Q_{13}$ output of the counter 44, which is applied to the counter 54 through an OR-gate 60; this gate is disabled under certain conditions (described below) to prevent further stepping of the counter 54. (Stepping of the counter 54 can also be inhibited by a reset input to the counter 54, which will also be described below). The $Q_{13}$ output of the counter 44 will step the counter 54 (when not inhibited) once every 8192 cycles of the a.c. mains supply, or, in other words, once every 2.73 minutes, and the resistor 58 is so selected that each step produces the same change in the output of the amplifier 48 as a 0.67 mV decrease in battery cell voltage; this is equivalent to a change of 11 mV every 45 minutes.

Three other current signals are also fed to the summing node. Firstly, a mains voltage compensation signal is derived from the mains supply by a transformer 64 feeding a half-wave rectifying and smoothing circuit 66. The compensation signal produced by the circuit 66, which goes more positive with an increase in mains supply voltage, is connected through a resistor 68 to the summing node, to modify the signal A, as described above. Thus, if the mains voltage should, for example, increase slightly, the current flowing to the summing node through the resistor 68 will increase correspondingly, but this increase will be accompanied by a corresponding increase in the current flowing away from the summing node through the resistor 50, because the battery terminal voltage will also have increased slightly, even though its state of charge is unaltered. (As mentioned above, this is only strictly true when the battery is nearly fully charged.)

Secondly, an adjustable resistor 70 is connected from the positive supply rail to the summing node. This resistor provides a constant bias signal, which is so adjusted that the output of the amplifier 48 remains negative until the battery voltage reaches 2.35 volts per cell.

Thirdly, the shiftable bias signal which has already been described is generated by a circuit 72, which, like the circuit 52, comprises an 8-bit binary counter 74 coupled to a digital-analogue converter 76. The analogue output of the converter 76 is connected through a resistor 78 to the summing node; the resistor 78 is so selected that each step of the counter produces the same change in the output of the amplifier 48 as a decrease of about 2.4 mV in the battery cell voltage, that is to say, a negative step of about 110 mV, as mentioned above.

The output of the amplifier 48 is monitored by two comparators 80 and 82. The comparator 80 is responsible for determining when the output of the amplifier goes above 150 mV, and therefore it has one input (the inverting input) connected to the amplifier output, and the other connected to a reference voltage of about 125 mV provided by a potential divider 84 fed from a stabilised power supply rail. A positive feedback resistor 86 is also provided, to give a backlash of about ±25 mV, so that the positive-going switching threshold is about 150 mV. The comparator 82 is responsible for determining when the output of the amplifier 48 goes below zero, and therefore has its inverting input connected to the amplifier output, and its other input connected to ground.

The latch 46, which, as is mentioned above, is reset before the battery is connected, is set almost as soon as the output of the amplifier 48 has gone above 150 mV for the first time. To this end, the output of the comparator 80 is applied, through a NOR gate 88, to the setting input of the latch 46. Another input of the NOR gate 88 is connected to the $Q_5$ output of the counter 44, which provides a square wave at a frequency of about 1.6 Hz. Thus, immediately after the comparator 80 has switched, indicating that the output of the amplifier 48 is above 150 mV, the NOR gate 88 is enabled to pass this square wave. The first cycle of the square wave therefore sets the latch. The setting of the latch 46 causes the output of an inverter 96 to go high, and this removes a resetting signal from the reset input of the counter 54, allowing it to begin to count; until this point, counting has been inhibited, so that the voltage steps making up the ramp signal B cannot occur. The output of the NOR gate 88 is also passed, through an inverter 90, to the clock input of the counter 74, so that, on the first cycle of the square wave to be passed by the gate 88, the counter 74 is stepped, taking the input to the comparator 80 below its 100 mV negative-going switching threshold. This disables the NOR gate 88 again, so that, on each occasion when the output of amplifier 48 rises above 150 mV, a single clock pulse is passed to the counter 74.

As mentioned above, the output of the comparator 82 goes positive when the output of the amplifier 48 goes negative, which is an indication that the charge should be terminated. The output of the comparator is therefore connected to one input of the NAND gate 34, to de-energise the relay coil 22B at the appropriate time. However, since the output of the comparator 82 will also be positive during the early stages of a charge, before the battery voltage rises above 2.35 volts per cell, the gate 34 is disabled by a further input during this part of the charge, to prevent premature termination. This disabling input is provided by the sixth count output of a decade counter 92 (this counter is of the type providing a 1-out-of-10 output). During charging, the counter 92 is continuously supplied with a clock signal from the $Q_{13}$ output of the counter 44, but the counter 92 also has a reset input by means of which counting is inhibited until the battery voltage reaches 2.35 volts per cell. The signal which is applied to the reset input to achieve this result is the output of a NAND gate 94, whose inputs are provided by the outputs of the inverters 90 and 96. Thus, the reset signal is maintained as long as the latch 46 has not been set, because the inverter 96 produces a low output. After the battery voltage reaches 2.35 volts per cell, the latch 46 is set, but now, every time the output of the amplifier 48 goes above 150 mV, the inverter 90 will deliver one cycle of the $Q_5$ waveform to step the counter 74, and this cycle will also have the effect of resetting the counter 92, through the gate 94. Thus, although the counter 92 is allowed to count, it cannot reach a count of 6 before being reset unless the rate of rise of battery voltage has fallen low enough for the period between successive steppings of the counter 74 to be quite long. More specifically, the time between successive steppings must be greater than some value which lies between 13.7 and 16.4 minutes if the counter is to reach a count of 6 without being reset. This implies that the rise in the output of the amplifier 48 in that time must not exceed 110 mV.

Differently expressed, the rise in battery cell voltage must not exceed 11 mV in 45 minutes by an amount greater than 2.4 mV in between 13.7 and 16.4 minutes, that is to say, the cell voltage rise must not be greater than about 17 mV in 45 minutes, and the cell voltage must also have risen above 2.35 volts. These conditions will be fulfilled only when the battery is approaching the fully charged state. When the counter 92 does reach a count of 6, further counting is inhibited, because the sixth count output is connected to a count inhibit input of the counter, as well as to an input of the NAND gate 34. If this state has been reached, and the output of the comparator 82 also goes positive, the output of the gate 34 will then go negative, terminating the charge. Thus, it will be understood that the charge cannot be terminated by switching of the comparator 82 unless the battery has already been indicated as approaching the fully charged state by the fact that the counter 92 has reached a count of 6.

In addition to disabling the gate 30 to terminate the charge, the output of the gate 34 is also supplied to the set input of a bistable latch 98. This latch controls an indicator lamp 100, through a suitable driver circuit 102, and is reset when the charger is first connected to an a.c. mains supply by means of an initial reset pulse derived from an initial reset circuit 104. The lamp 100 remains off as long as the latch 98 is reset, but is turned on when the latch is set, indicating that the main charge has been terminated.

The counter 54 continues to count for the moment, so long as the a.c. mains supply is still present. Thus, when a period of about 5.8 hours has elapsed from the time at which the battery voltage reached 2.35 volts per cell, the $Q_8$ output of the counter 54 will go high. This output is connected to a second reset input of the latch 32, so that, if the charge has still not been terminated by the mechanism described above, it will be terminated by the resetting of the latch 32. If this happens, both the latches 32 and 98 will be in the reset state; this condition is detected by a NOR gate 106, which then provides a high output to an input of the OR gate 60, to disable this gate and prevent further stepping of the counter 54.

If, on the other hand, the main charge has already been terminated when the $Q_8$ output of the counter 54 goes high, the latch 98 will already have been set, and the OR gate 60 cannot be disabled. Thus, after 5.8 hours, the latch 32 will be reset, but the counter 54 will continue to count, and after a further period of 5.8 hours, the $Q_8$ output will go low again, allowing the latch 32 to be set by the next $Q_8$ signal from the counter 44. Thus, charging will recommence, provided that the battery 18 is still connected, and this charge will be terminated in much the same way as was described above. It may be pointed out that the output of the latch 32 is connected to a reset input of the counter 74, ensuring that the shiftable bias signal produced by the converter 76 is reset to its starting value when the charge recommences. However, the latch 46 is not reset, and therefore the ramp signal B commences as soon as charging has recommenced.

If the battery 18 should be disconnected while charging is in progress, the voltage between the terminals 16 will rise above 3.5 volts per cell of the battery, and this fact is detected by a comparator 108 and used to stop the charge. The comparator has its non-inverting input connected to the output of the potential divider 40, and its other input is connected to a tapping on the potential divider 38 which provides a voltage of about −3.5 volts. Thus, the output of the comparator 108 will go negative if the battery is disconnected. This output is coupled in parallel with the output of the comparator 36, which determines when the voltage on the terminals 16 rises above 1.5 volts per cell, and therefore, when the output of the comparator goes negative, this effect is transmitted to the gate 42, to reset the latch 32 and terminate the charge promptly. The latch 46 and the counter 44 are also reset at the same time.

A second input to the NAND gate 42 is supplied with the initial reset pulse from the circuit 104. This ensures that, if the battery 18 is connected to the terminals 16 before the charger is connected to the mains supply, or if the mains supply should be interrupted during the progress of a charge, the counter 44 and the latches 32 and 46, as well as the latch 98, will be reset when the a.c. supply is connected (or reconnected).

In the alternative arrangement shown in FIG. 5, the battery voltage signal A, ramp signal B, and mains compensation signal are generated by circuits 200, 202 and 204 respectively (not shown in detail), and are combined by a summing amplifier 206. The amplifier output is connected to a negative peak rectifying circuit comprising a diode 208 and a capacitor 210; the amplifier 206 is connected as an inverting amplifier, so that the voltage on the capacitor 210 is an indication of the greatest value so far reached by the signal C of FIG. 2. The voltage on the capacitor 210 is also fed back, through a negative feedback resistor 212, to the summing node of the amplifier 206. Thus, as long as the changes in the inputs applied to the amplifier are only such as will produce a negative shift in the amplifier output, the feedback resistor 212 will be effective to limit the closed-loop gain of the amplifier. However, a change in the opposite sense in the inputs applied to the amplifier, which represents a decrease in the signal C of FIG. 2, tends to reverse bias the diode 208, so that the feedback resistor 212 is no longer effective, and a large positive swing appears at the output of the amplifier 206. This change is detected by a comparator 214, which monitors the voltage across the diode 208, and terminates the charge when it detects the change from forward bias to strong reverse bias on the diode.

What I claim as my invention and desire to secure by Letters Patent is:

1. Means for terminating the charging of an electric storage battery, or a phase of such a charge, including:
    means for producing a battery signal dependent on battery voltage, a progressively increasing ramp signal, and a shiftable bias signal;
    signal combining means producing a combined signal comprising a combination of the battery signal, the ramp signal and the bias signal, which combined signal increases with increase of battery voltage, but decreases with increase of ramp signal, or increase of bias signal; and
    means for increasing the bias signal whenever the combined signal exceeds a higher predetermined value, to decrease the combined signal by a predetermined amount to a lower predetermined value, and means to terminate the charge, or a phase of the charge, when the combined signal falls below a value lower than the said lower predetermined value.

2. Means for terminating the charging of an electric storage battery, or a phase of such a charge, including:
    a first input line which is connected to a source of a signal dependent on battery voltage;
    a second input line which is connected to a source of a ramp signal;
    signal combining means having an output line, and being arranged to produce, on the output line, a signal comprising a combination of the signals on the two input lines, which combination signal changes in one sense in response to a rise in battery voltage, and in the opposite sense in response to the rise of the ramp signal;
    combination signal monitoring means arranged to monitor the combination signal on the output line, and including shiftable bias signal storing means connected to the output of the signal combining means and arranged to store the extreme value which the combination signal has so far reached in the said one sense; and
    comparing means connected to the storing means to receive the stored extreme value, and to the output of the signal combining means, and arranged to compare the stored extreme value with the actual value of the combination signal, and to terminate the charge, or a phase of it, when the combination signal changes in the said opposite sense by more than a predetermined amount from the stored extreme value.

3. Charge terminating means as claimed in claim 2 in which the signal storing means comprises an analogue store.

4. Means for terminating the charging of an electric storage battery, or a phase of such a charge, including:
    a first input line which is connected to a source of a signal dependent on battery voltage;
    a second input line which is connected to a source of a ramp signal;
    a third input line which is connected to a shiftable bias signal storing means;
    signal combining means having an output line, and being arranged to produce, on the output line, a combination signal comprising a combination of the signals on the three input lines, which combination signal changes in one sense in response to a rise in battery voltage, and in the opposite sense in response to the rise of the ramp signal; and
    combination signal monitoring means arranged to monitor the combination signal on the output line, and connected to stored bias signal modifying means arranged, when the combination signal reaches a predetermined value, to modify the stored shiftable bias signal in such a sense as to prevent the combination signal from shifting in the said one sense beyond the said predetermined value, the combination signal monitoring means also being arranged to terminate the charge, or a phase of it, when the combination signal changes in the said opposite sense by more than a predetermined amount from the said predetermined value.

5. Charge terminating means as claimed in claim 4 in which the signal storing means comprises a digital store.

6. Charge terminating means as claimed in claim 5, which also includes termination preventing means arranged to prevent termination of the charge by the combination signal monitoring means until the period between changes in the digitally-stored signal exceeds a predetermined value.

7. Charge terminating means as claimed in claim 6 which includes means arranged to prevent termination of the charge by the combination signal monitoring means before the battery voltage reaches a predetermined value.

8. Charge terminating means as claimed in claim 7, in which the termination preventing means comprises a digital counter connected to a source of clock signals and arranged to be reset each time the digitally-stored signal changes, and also arranged to be prevented from counting until the battery voltage reaches the said predetermined value.

9. Charge terminating means as claimed in claim 2 or claim 4 which includes means connected to the source of the ramp signal, and arranged to prevent the rise of the ramp signal until the battery voltage reaches a predetermined value.

10. Charge terminating means as claimed in claim 9, in combination with a charger for lead-acid batteries, which terminating means is so arranged that the said predetermined value is 2.35 volts per cell.

11. Charge terminating means as claimed in claim 2 or claim 4 in which the source of the said ramp signal is arranged to generate the ramp signal in the form of a series of discrete steps.

12. Charge terminating means as claimed in claim 11 which includes charge timing means arranged to terminate the charge after a predetermined time has elapsed from its commencement, if the charge has not already been terminated by the combination signal monitoring means.

13. Charger terminating means as claimed in claim 12, in which the ramp signal generating means comprises a digital counter connected to a source of clock signals and coupled to a digital-analogue converter, and the charge timing means is controlled by a count output of the counter to terminate the charge after the said predetermined time.

14. Charge terminating means as claimed in claim 11, which includes interval timing means arranged to restart the charge at intervals after termination of the charge by the combination signal monitoring means.

15. Charge terminating means as claimed in claim 14, in which the ramp signal generating means comprises a digital counter connected to a source of clock signals and coupled to a digital-analogue converter, and the interval timing means is controlled by a count output of the counter to restart the charge at intervals determined by the counter.

16. Charge terminating means as claimed in claim 15, which also includes charge timing means arranged to terminate the charge after a predetermined time has elapsed from its commencement, if the charge has not already been terminated by the combination signal monitoring means, the charge timing means being connected to a count output of the said digital counter, whereby the signals on the count output determine the said predetermined time, and the charge terminating means also including disabling means connected to the digital counter and arranged to disable further counting of the counter, and thereby prevent restarting of the charge, if the charge timing means should become effective to terminate the charge.

17. Charge terminating means as claimed in claim 2, or claim 4, in which the signal combining means also has an input for a signal dependent on mains supply voltage, and is arranged to produce a combination signal which, at least when the battery is nearly fully charged, is independent of variations in mains supply voltage.

18. Charge terminating means as claimed in claim 17, which also includes termination preventing means arranged to detect when the battery is approaching the fully charged condition, and to prevent termination of the charge by the combination signal monitoring means until the said approach is detected.

* * * * *